United States Patent
Fukui (10) Patent No.: US 7,167,423 B2
(45) Date of Patent: Jan. 23, 2007

(54) OPTICAL DISC APPARATUS

(75) Inventor: Toshiaki Fukui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 560 days.

(21) Appl. No.: 10/761,198

(22) Filed: Jan. 22, 2004

(65) Prior Publication Data

US 2004/0165493 A1    Aug. 26, 2004

(30) Foreign Application Priority Data

Jan. 23, 2003    (JP)    ............................ P2003-015136

(51) Int. Cl.
*G11B 7/00*    (2006.01)

(52) U.S. Cl. ............................... 369/44.32; 369/44.41; 369/44.34; 369/44.28

(58) Field of Classification Search ..................... None
See application file for complete search history.

(56) References Cited

U.S. PATENT DOCUMENTS 6,580,670 B1 *   6/2003   Kim et al. ................ 369/44.41
2002/0141306 A1 * 10/2002  Miyanabe et al. ....... 369/47.17

FOREIGN PATENT DOCUMENTS

| JP | 10-64080 | 3/1998 |
| JP | 2001-84605 A | 3/2001 |
| JP | 2001-222827 | 8/2001 |

* cited by examiner

*Primary Examiner*—Muhammad Edun
(74) *Attorney, Agent, or Firm*—Morgan, Lewis & Bockius, LLP (57) ABSTRACT

An optical disc apparatus has a crosstalk level determining section which, when a track jump is performed without applying a tracking servo, determines whether a crosstalk component is larger than a predetermined level or not. If the crosstalk level determining section determines that the crosstalk component is larger than the predetermined level, a crosstalk correcting section performs a calculation for reducing the crosstalk component. If the crosstalk level determining section determines that the crosstalk component is not larger than the predetermined level, the crosstalk correcting section does not reduce the crosstalk component.

9 Claims, 6 Drawing Sheets

OPTICAL DISC APPARATUS

BACKGROUND OF THE INVENTION

1. Field of the Invention

The present invention relates to an optical disc apparatus having a photo detector in which a detecting area is divided into four regions, and more particularly to an optical disc apparatus in which a crosstalk component in a focus error signal produced by a tracking error signal is reduced.

2. Description of the Related Art

In an apparatus which has a photo detector configured by four detecting areas arranged in a two by two matrix, and which has a function of writing information onto an optical disc such as a DVD or a CD, when the attaching position of the photo detector involves an error, a phenomenon that a tracking error component affects a focus error component occurs in a track jump in which a laser spot crosses lands and grooves. This phenomenon is called a T-F crosstalk. When a T-F crosstalk occurs, there arise problems in that defocusing is caused, and that focus-on is hardly attained. Therefore, it is required to attach a photo detector with high accuracy. However, it is often difficult to attain such high accuracy in manufacturing process of the apparatus.

Therefore, a conventional technique (referred to as a first conventional technique) has been proposed in which, even when a T-F crosstalk occurs, the level of the T-F crosstalk is lowered, whereby situations such as those where focus-on is hardly attained, and where defocusing easily occurs are less caused, so that the tolerance of attachment of a photo detector can be increased (a part of apparatuses which have been regarded as defective due to a large positional deviation of a photo detector can be regarded as nondefective so as to be useful). In this technique, a radial push-pull signal (tracking error signal) which is a difference signal between a result of an addition of two detecting areas that are positioned on one side with respect to the track axis, and that of an addition of two detecting areas that are positioned on the other side is multiplied with a tangential push-pull signal which is a difference signal between a result of an addition of two detecting areas that are positioned on one side with respect to an axis orthogonal to the track axis, and that of an addition of two detecting areas that are positioned on the other side. A signal which is obtained by multiplying a result of the multiplication by K is subtracted from a focus error signal, whereby the T-F crosstalk is reduced (for example, see JP-A-10-064080).

Also the following conventional technique (referred to as a second conventional technique) has been proposed. In this technique, the level of a tracking error signal is divided into plural level stages, and a track jump for level sampling is previously performed. In the track jump, for each of the divided levels of the tracking error signal, the level of the corresponding focus error signal (the level of a T-F crosstalk) is stored into a waveform memory. Namely, the level of the tracking error signal corresponds to that of the T-F crosstalk. In a track jump for the regular seeking procedure or the like, the level of the focus error signal is corrected by the level of the focus error signal (the level of the T-F crosstalk) which is previously stored in the waveform memory in correspondence with (is previously brought into correspondence with) the level of the tracking error signal when a laser spot crosses a track. Therefore, the corrected focus error signal is a signal in which the T-F crosstalk is eliminated (for example, see JP-A-2001-222827, specifically in paragraph [0026]).

In the first conventional technique, the signal which is obtained by multiplying the result of the multiplication of the tangential push-pull signal and the radial push-pull signal by K is always subtracted from the focus error signal. In some cases, level variations of the focus error signal in a track jump are produced by a T-F crosstalk, and, in other cases, such level variations are produced by another cause. In the case where level variations of the focus error signal are produced by a cause other than a T-F crosstalk, when a process of subtracting a signal which is obtained by multiplying the result of the multiplication of the tangential push-pull signal and the radial push-pull signal by K from the focus error signal is performed, therefore, the level change width of the focus error signal after the process is sometimes larger than that before the process. When such a situation arises, focus disturbances such as defocusing easily occur.

This problem is produced similarly in the second conventional technique in the following manner. In the case where level variations of the focus error signal are produced by a T-F crosstalk, the level of the focus error signal stored in the waveform memory indicates the level of the T-F crosstalk. By contrast, in the case where level variations of the focus error signal are produced by a cause different from a T-F crosstalk, the level of the focus error signal stored in the waveform memory shows variations which are not correlated with the period of the tracking error signal. When, even in this case, the focus error signal is corrected by the level stored in the waveform memory, the level change width of the focus error signal after the process is larger than that in the case where the correction is not performed. As a result, a situation arises in which focus disturbances such as defocusing more easily occur.

SUMMARY OF THE INVENTION

It is therefore an object of the invention is to provide an optical disc apparatus in which, even when a crosstalk component is to be reduced, focus disturbances can be reduced in a situation where level variations of a focus error signal are produced by a cause other than a crosstalk, the reduction rate of a crosstalk component can be enhanced, the accuracy of detection on whether a crosstalk component is larger than a predetermined level or not can be improved, and a block for determining whether a crosstalk component is larger than a predetermined level or not can be prevented from being complicated in configuration.

It is another object of the invention to provide an optical disc apparatus in which, in the case where, even when a crosstalk component is to be reduced, a situation in which level variations of a focus error signal is produced by a cause other than a crosstalk occurs, a state in which focus disturbances are further increased can be prevented from occurring by, when a track jump without applying the tracking servo is performed, checking whether a crosstalk component is larger than a predetermined level or not, and, only when the crosstalk component is larger than the predetermined level, reducing the crosstalk component.

It is a further object of the invention to provide an optical disc apparatus in which the reduction rate of a crosstalk component can be enhanced by subtracting a tracking error signal having an amplitude that is corrected on the basis of a ratio of a level change width of the tracking error signal and a level change width of the crosstalk component, from a focus error signal.

It is a still further object of the invention to provide an optical disc apparatus in which the accuracy of detection on whether a crosstalk component is larger than a predetermined level or not can be improved by determining whether a cross component is larger than a predetermined level or not on the basis of the period and width of level changes appearing in a focus error signal.

In order to solve the problems, according to a first aspect of the invention, there is provided an optical disk apparatus including: a photo detector in which a detecting area thereof is divided into four detecting areas by two axes of a track axis arranged in parallel to a track of an optical disk and an axis orthogonal to the track axis, and configured to detect light reflected from the optical disc; an error signal generating circuit configured to calculate a first difference between a result of an addition of outputs of one diagonal pair of detecting areas and a result of an addition of outputs of the other diagonal pair of detecting areas, and a second difference between a result of an addition of outputs of a pair of detecting areas positioned on one side with respect to the track axis and a result of an addition of outputs of the other pair of detecting areas positioned on the other side with respect to the track axis, and to output the result of the calculation of the first difference and the second difference as a focus error signal and a tracking error signal, respectively; a crosstalk correcting section configured to reduce a crosstalk component in the focus error signal, the crosstalk component produced by the tracking error signal when a track jump is performed; a crosstalk level determining section including: a first counting unit configured to count a number of level changes of the tracking error signal; and a second counting unit configured to count a number of level changes of the focus error signal that are larger than a predetermined width, and configured to determine that the crosstalk level is larger than a predetermined value by assuming that the crosstalk component is larger than a width of level changes of the focus error signal is larger than a predetermined value, and a period of level changes of the focus error signal is approximate to a period of level changes of the tracking error signal, in a case where a count result of the first counting unit is approximate to a count result of the second counting unit when the track jump is performed without applying a tracking servo; and a change width ratio determining section configured to detect a ratio of a level change width of the tracking error signal and a level change width of the crosstalk component in a case where the track jump is performed without applying the tracking servo, wherein the crosstalk correcting section is configured to reduce the crosstalk component by: increasing or decreasing the level change width of the tracking error signal in accordance with the ratio detected by the change width ratio determining section; and subtracting the tracking error signal in which the level change width is increased or decreased, from the focus error signal, in a case where the crosstalk level determining section determines that the crosstalk component is larger than the predetermined level, and is configured not to reduce the crosstalk component in a case where the crosstalk level determining section determines that the crosstalk component is not larger than the predetermined level.

According to the first aspect of the invention, when a crosstalk which may cause focus disturbances such as defocusing is produced, the crosstalk level determining section determines that the crosstalk component is larger than the predetermined level, and hence the crosstalk component is reduced by the crosstalk correcting section. In the case where level changes of the focus error signal are produced by a cause different from a crosstalk, the crosstalk level determining section does not determine that the crosstalk component is larger than the predetermined level. In this case, therefore, the calculation of subtracting the level-corrected tracking error signal from the focus error signal (when this calculation is performed, the level change width of the focus error signal is larger than that before the calculation) is not performed, and hence a situation in which the level change width of the focus error signal is increased is prevented from arising. Moreover, a signal of a level which can most reduce a crosstalk component is subtracted from the focus error signal. Furthermore, the period of level changes of a crosstalk component appearing in the focus error signal is equal to that of level changes of the tracking error signal. In the case where level changes of the focus error signal are produced by a cause different from a crosstalk, even when the change width is larger than the predetermined level, therefore, it is not determined that the level changes are caused by a crosstalk. The crosstalk level determining section can be easily realized by a relatively simple circuit.

According to a second aspect of the invention, there is provided an optical disk apparatus including: a photo detector configured to detect light reflected from an optical disc; an error signal generating circuit configured to output a focus error signal and a tracking error signal based on an output of the photo detector; a crosstalk correcting section configured to reduce a crosstalk component in the focus error signal, the crosstalk component produced by the tracking error signal when a track jump is performed; and a crosstalk level determining section configured to determine whether or not the crosstalk level is larger than a predetermined value in a case where the track jump is performed without applying a tracking servo, wherein the crosstalk correcting section is configured to reduce the crosstalk component by use of the tracking error signal in a case where the crosstalk level determining section determines that the crosstalk component is larger than the predetermined level, and is configured not to reduce the crosstalk component in a case where the crosstalk level determining section determines that the crosstalk component is not larger than the predetermined level.

According to the second aspect of the invention, when a crosstalk which may cause focus disturbances such as defocusing is produced, the crosstalk level determining section determines that the crosstalk component is larger than the predetermined level, and hence the crosstalk component is reduced by the crosstalk correcting section. In the case where level variations of the focus error signal are produced by a cause different from a crosstalk, the crosstalk level determining section does not determine that the crosstalk component is larger than the predetermined level. In this case, therefore, the calculation of subtracting the level-corrected tracking error signal from the focus error signal (when this calculation is performed, the level change width of the focus error signal is larger than that before the calculation) is not performed, and hence a situation in which the level change width of the focus error signal is increased is prevented from arising.

BRIEF DESCRIPTION OF THE DRAWINGS

The above objects and advantages of the present invention will become more apparent by describing q preferred embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 5:
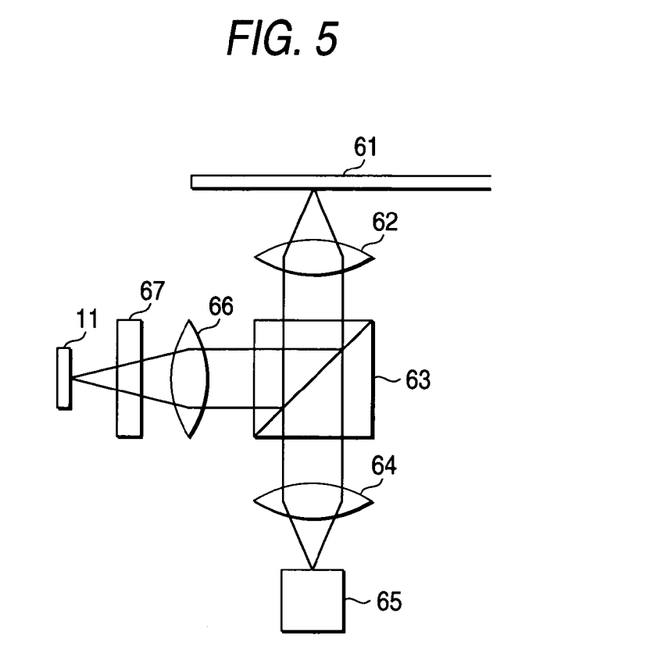
FIG. 5 is a diagram showing a path of a laser beam in the embodiment.

FIG. 5 is a diagram showing a path of a laser beam in an embodiment of the optical disc apparatus of the invention. In the embodiment, the invention is applied to a DVD apparatus which can write information onto an optical disc such as a writable DVD or CD.

Referring to the figure, a laser beam emitted from a semiperformor laser diode 65 is converted to a parallel laser beam by a collimating lens 64. The laser beam is then transmitted through a polarization beam splitter 63, and thereafter converged to an optical disc 61 by an objective lens 62. As a result, an optical spot is formed on a pit row of an information recording plane of the optical disc 61.

The laser beam reflected from the optical disc 61 is condensed by the objective lens 62, and then reflected toward a detection lens 66 by the polarization beam splitter 63. The laser beam converged by the detection lens 66 is transmitted through a cylindrical lens 67 which is an astigmatism generating element, to form a spot in the vicinity of the center of a photo detector 11. When the objective lens 62 is placed at an adequate position, i.e., when the spot formed on the photo detector 11 is focused on the information recording plane of the optical disc 61, the spot has a true circular shape. When the objective lens 62 is deviated from the adequate position, the spot has an oval shape.

Figure 1:
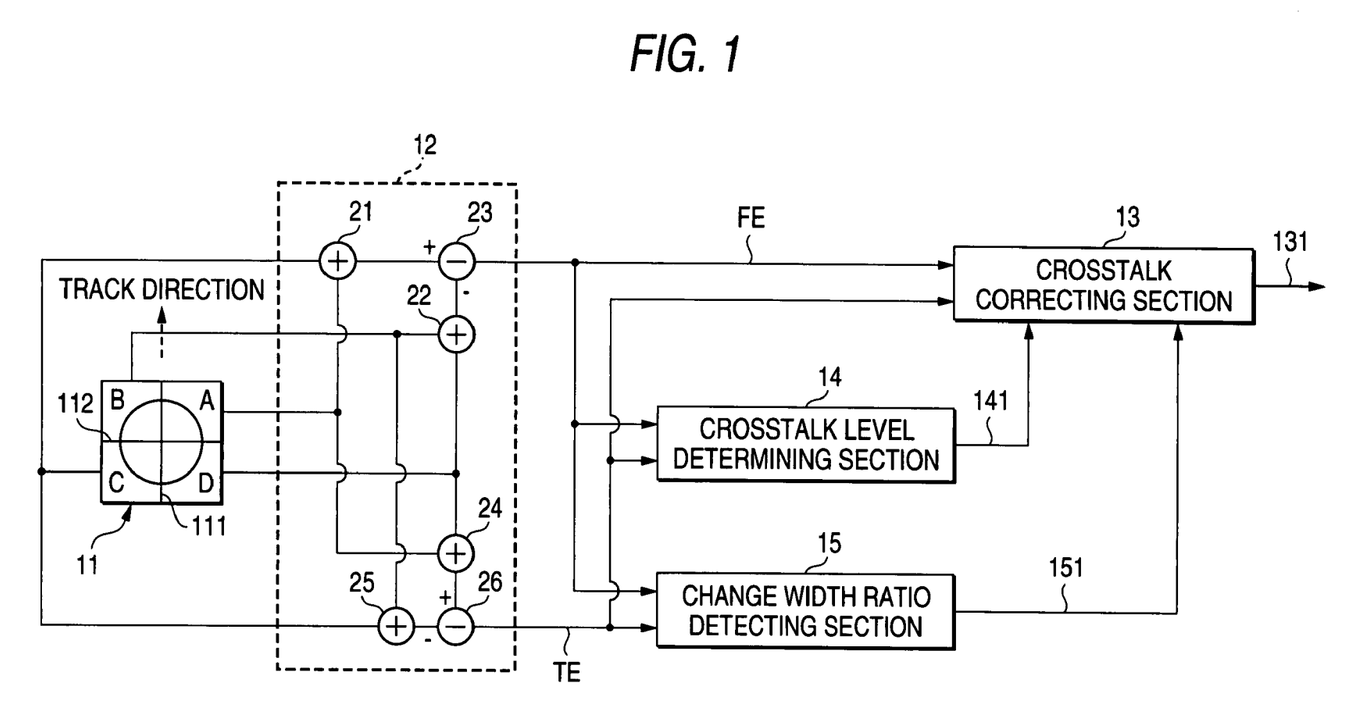
FIG. 1 is a block diagram showing an electrical configuration of an embodiment of the optical disc apparatus according to the invention.

FIG. 1 is a block diagram showing the electrical configuration of the embodiment. In the figure, only portions for generating a focus error signal are shown.

In the photo detector 11 configured by photodiodes, the detecting area is divided into four detecting areas A, B, C and D by two axes of a track axis 111 in which arranged in parallel to a track of an optical disk and an axis 112 orthogonal to the track axis 111. An adder 21 adds together outputs of a pair of the detecting areas A and C which are diagonal ones of the four detecting areas A through D. An adder 22 adds together outputs of a pair of the detecting areas B and D which are the other diagonal ones of the four detecting areas A through D. A subtractor 23 subtracts an output of the adder 22 from that of the adder 21, and outputs the result of the subtraction as a focus error signal FE.

An adder 24 adds together outputs of two of the four detecting areas A through D, i.e., the detecting areas A and D which are positioned on one side with respect to the track axis 111. An adder 25 adds together outputs of the two others of the four detecting areas A through D, i.e., the detecting areas B and C which are positioned on the other side with respect to the track axis 111. A subtractor 26 subtracts an output of the adder 25 from that of the adder 24, and outputs the result of the subtraction as a push-pull tracking error signal (the signal indicative of a difference set forth in the claims) TE. A block 12 configured by the four adders 21, 22, 24, 25 and the two subtractors 23, 26 constitutes an error signal generating circuit 12 in the embodiment.

A crosstalk level determining section 14 determines whether, in a track jump without applying a tracking servo is performed, a crosstalk component produced in the focus error signal FE is larger than a predetermined level or not. Here, the track jump without applying a tracking servo is implemented when the optical disc 61 is already set at power-on or the optical disc 61 is replaced with another one.

Specifically, when, as a result of performing a track jump without applying the tracking servo, the width of level changes of the focus error signal FE is larger than a predetermined value, and the period of level changes appearing in the focus error signal FE is approximate to that of level changes of the tracking error signal TE, it is determined that the crosstalk component is larger than the predetermined level.

A change width ratio determining section 15 detects a ratio of the level change width of the tracking error signal TE and that of the crosstalk component when the track jump without applying the tracking servo is performed. Namely, when the track jump without applying the tracking servo is performed, the section detects the peak-to-peak value (hereinafter, abbreviated to P-P value) of the tracking error signal TE, and the P-P value of the focus error signal FE. Thereafter, the section calculates the ratio of the two detected P-P values, and transmits the result of the calculation to a crosstalk correcting section 13.

The crosstalk correcting section 13 reduces the crosstalk component of the tracking error signal TE which is produced in the focus error signal FE in the track jump, with using a signal (the tracking error signal TE) indicative of the difference between the result of the addition of the outputs of two of the four detecting areas A through D, i.e., the detecting areas A and D which are positioned on the one side with respect to the track axis 111, and that of the addition of the outputs of the detecting areas B and C which are positioned on the other side.

Specifically, if the crosstalk level determining section 14 determines that the crosstalk component is larger than the predetermined level, the crosstalk correcting section 13 reduces the crosstalk component with using the tracking error signal TE. By contrast, if the crosstalk level determining section 14 does not determine that the crosstalk component is larger than the predetermined level, the crosstalk correcting section does not reduce the crosstalk component.

More specifically, the crosstalk correcting section 13 increases or decreases the level change width of the tracking error signal TE in accordance with the ratio which is detected by the change width ratio determining section 15, and subtracts the tracking error signal TE in which the level change width is increased or decreased, from the focus error signal FE, thereby reducing the crosstalk component.

Figure 2:
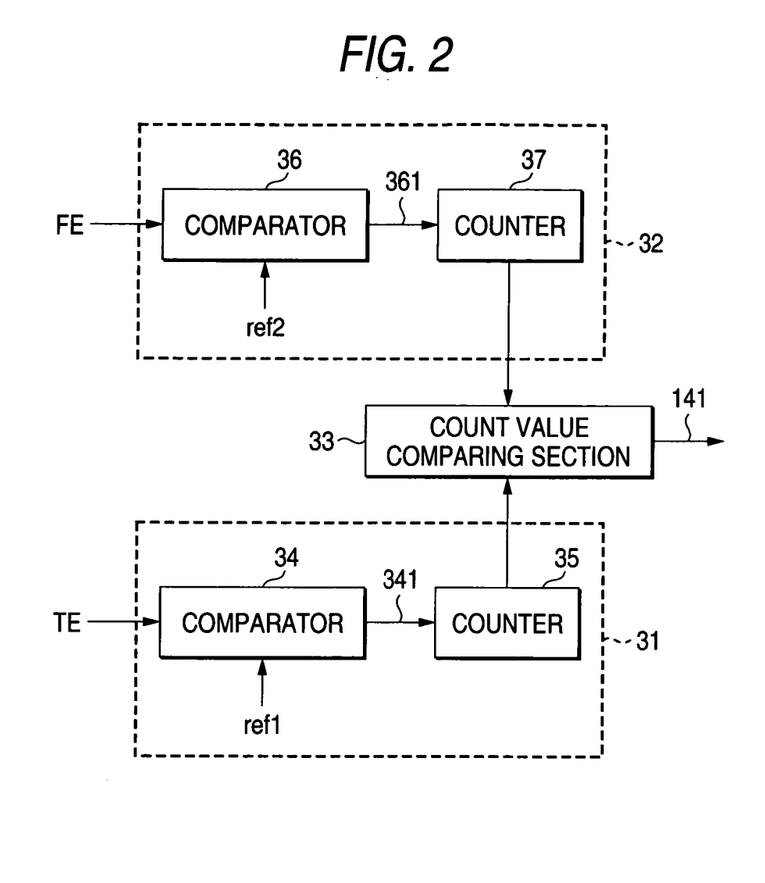
FIG. 2 is a block diagram showing in detail an electrical configuration of a crosstalk level determining section.

FIG. 2 is a block diagram showing in detail the electrical configuration of the crosstalk level determining section 14. The section generally includes a first counting unit 31, a second counting unit 32, and a count value comparing section 33.

Figure 8:
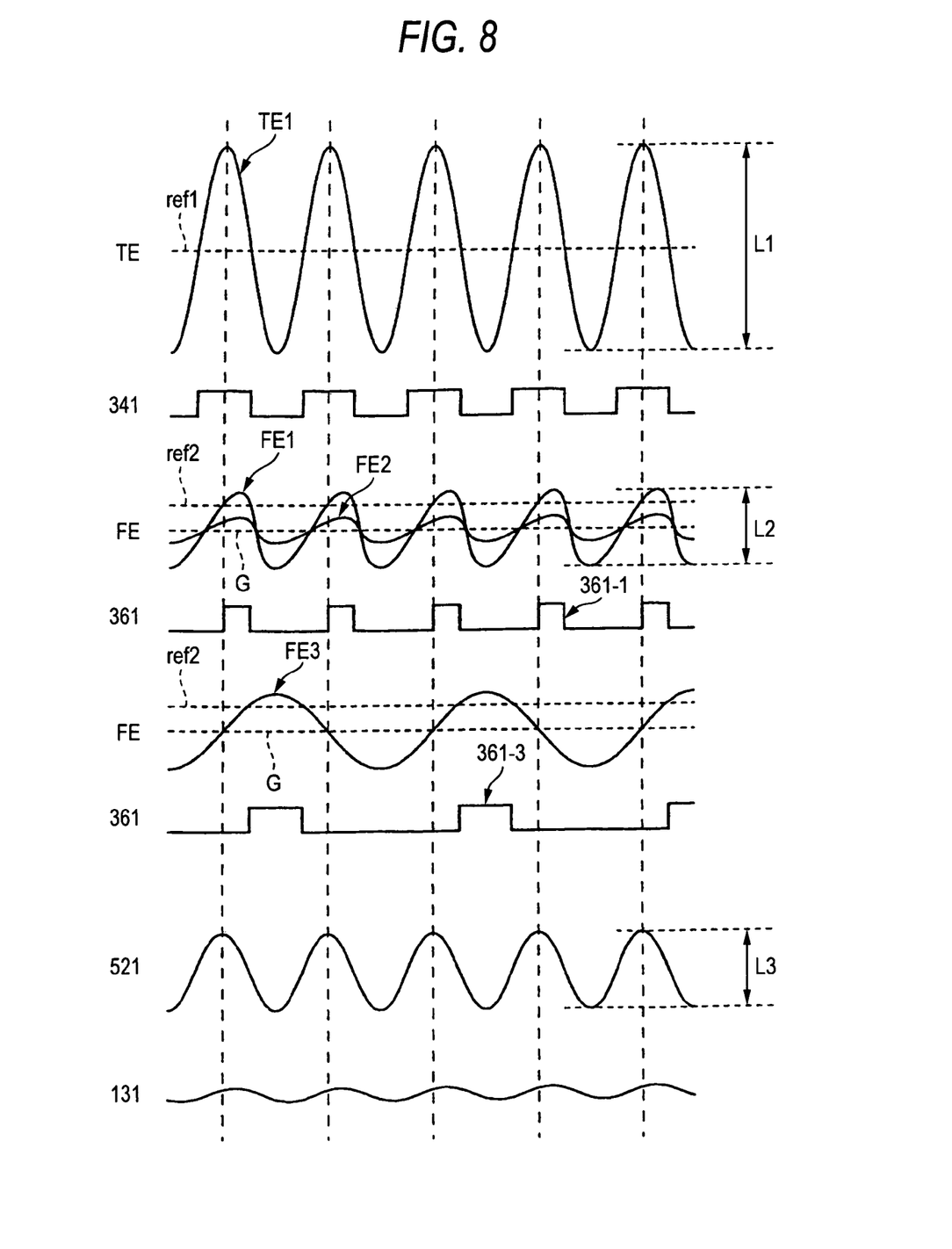
FIG. 8 is a view showing waveforms of main signals.

The first counting unit 31 counts the number of level changes of the tracking error signal TE. In order to perform the counting, the section includes: a comparator 34 in which the tracking error signal TE is supplied to one input; and a counter 35 which counts pulses output from the comparator 34. A reference voltage vref1 indicating the center level of the tracking error signal TE shown in FIG. 8 is given to the other input of the comparator 34. When a tracking error signal indicated by TE1 in FIG. 8 is supplied to the comparator 34, therefore, the comparator 34 outputs pulses indicated by 341.

The second counting unit 32 counts the number of level changes of the focus error signal FE which exceeds a predetermined width. In order to perform the counting, the section includes: a comparator 36 in which the focus error signal FE is supplied to one input; and a counter 37 which counts pulses output from the comparator 36. In order to prevent a DC component contained in the focus error signal FE from affecting the comparison, the comparator 36 compares a signal which is obtained by eliminating a DC component from the focus error signal FE, with a predetermined level ref2 (the predetermined level ref2 is a voltage (see FIG. 8) that is larger by a predetermined value than the center level G of the focus error signal FE from which a DC component is eliminated).

When the track jump without applying the tracking servo is ended, the count value comparing section 33 compares the count value of the counter 35 with that of the counter 37. When the count values of the two counters 35, 37 are approximate to each other, the section determines that a crosstalk component which exceeds the predetermined level is produced in the focus error signal FE. The result of the detection is transmitted to the crosstalk correcting section 13 via a signal line 141.

Figure 3:
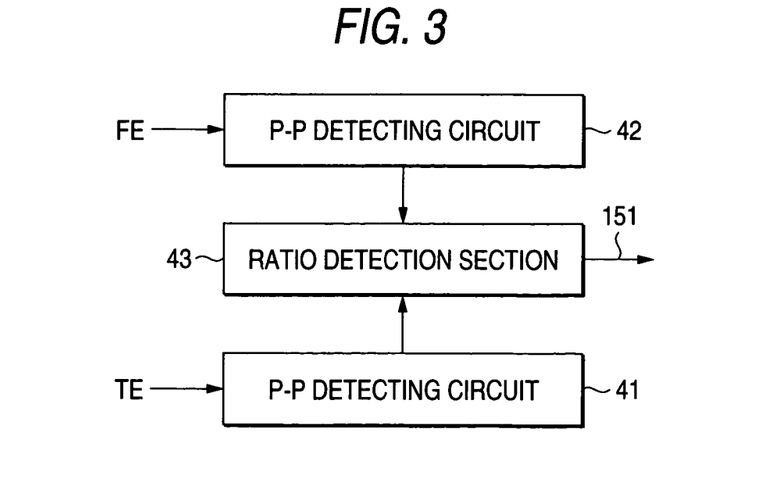
FIG. 3 is a block diagram showing in detail an electrical configuration of a change width ratio determining section.

FIG. 3 is a block diagram showing in detail the electrical configuration of the change width ratio determining section 15.

A P-P determining circuit 41 detects the P-P value (indicated by L1 in FIG. 8) of the tracking error signal TE, and transmits the result of the detection to a ratio determining section 43. A P-P determining circuit 42 detects the P-P value (indicated by L2 in FIG. 8) of the focus error signal FE, and transmits the result of the detection to the ratio determining section 43. When the detection result which is transmitted from the P-P determining circuit 41 in the track jump without applying the tracking servo is indicated by L1, and that which is transmitted from the P-P determining circuit 42 is indicated L2, the ratio determining section 43 obtains a ratio K which is defined as (K=L2/L1), and transmits the ratio to the crosstalk correcting section 13 via a signal line 151.

Figure 4:
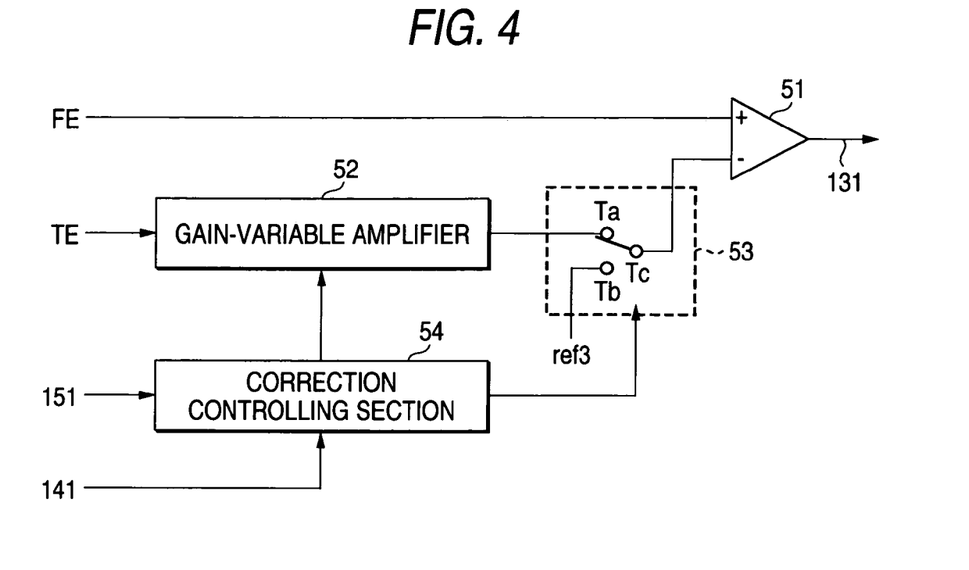
FIG. 4 is a block diagram showing in detail an electrical configuration of a crosstalk correcting section.

FIG. 4 is a block diagram showing in detail the electrical configuration of the crosstalk correcting section 13.

A gain-variable amplifier 52 amplifies the tracking error signal TE with a gain according to instructions from a correction controlling section 54, and outputs the amplified signal to a terminal Ta of a switch 53. The correction controlling section 54 controls the gain of the gain-variable amplifier 52, and the connection of the switch 53. Specifically, when the change width ratio determining section 15 outputs the ratio K to the signal line 151, the gain of the gain-variable amplifier 52 is set to K times. When the output 141 of the crosstalk level determining section 14 indicates that a crosstalk component exceeding the predetermined level is produced, a terminal Tc of the switch 53 is connected to the terminal Ta, and, when the output indicates that a crosstalk component exceeding the predetermined level is not produced, the terminal Tc is connected to a terminal Tb. A reference voltage ref3 of a predetermined level is applied to the terminal Tb of the switch 53.

A differential amplifier 51 subtracts a signal (the signal output from the switch 53) supplied to the minus input from the focus error signal FE supplied to the plus input, and transmits the result of the subtraction as a corrected focus error signal 131 to a servo circuit which is not shown. When the terminal Tc of the switch 53 is connected to the terminal Tb, therefore, the differential amplifier 51 outputs a signal which is identical with the input focus error signal FE, as the corrected focus error signal 131. By contrast, when the terminal Tc of the switch 53 is connected to the Terminal Ta, the differential amplifier performs a calculation of subtracting the tracking error signal TE obtained by multiplying the level change by K, from the focus error signal FE, and outputs the result of the calculation as the corrected focus error signal 131.

The first counting unit 31 is used also as a block which counts the number of jumped tracks in a track jump. Although the crosstalk level determining section 14 is disposed, therefore, it is possible to suppress the hardware from being increased.

Figure 6:
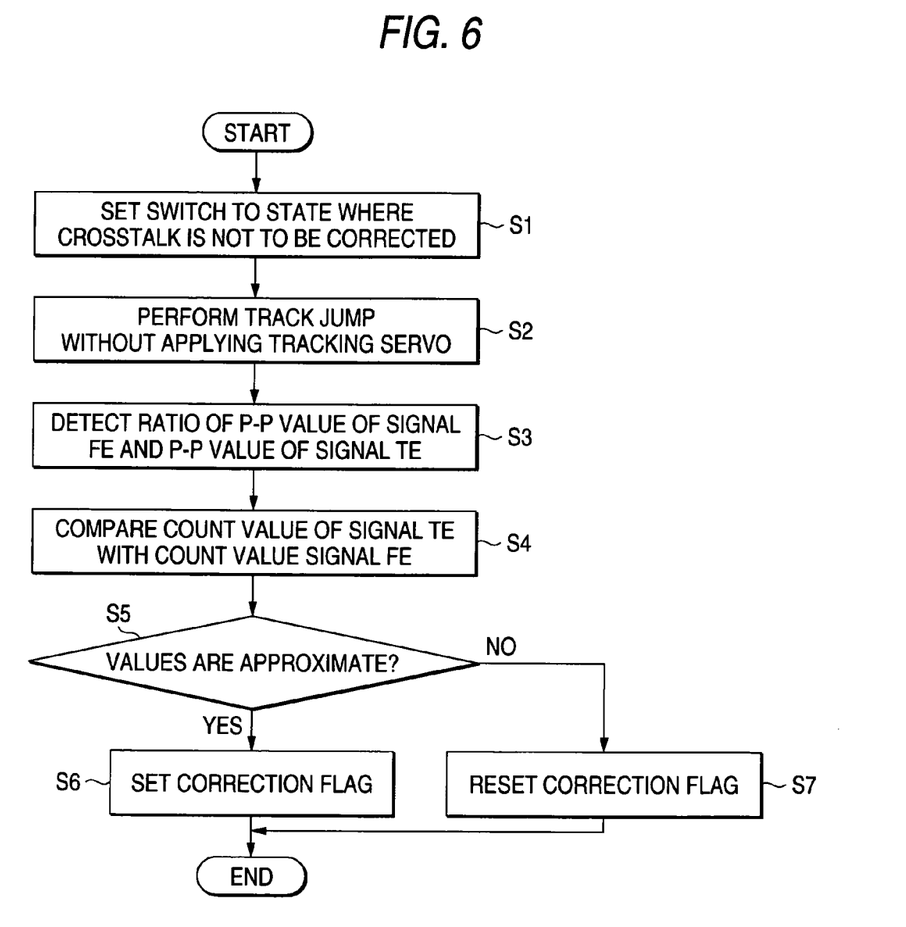
FIG. 6 is a flowchart showing main operations of the embodiment when a track jump without applying a tracking servo is performed.
Figure 7:
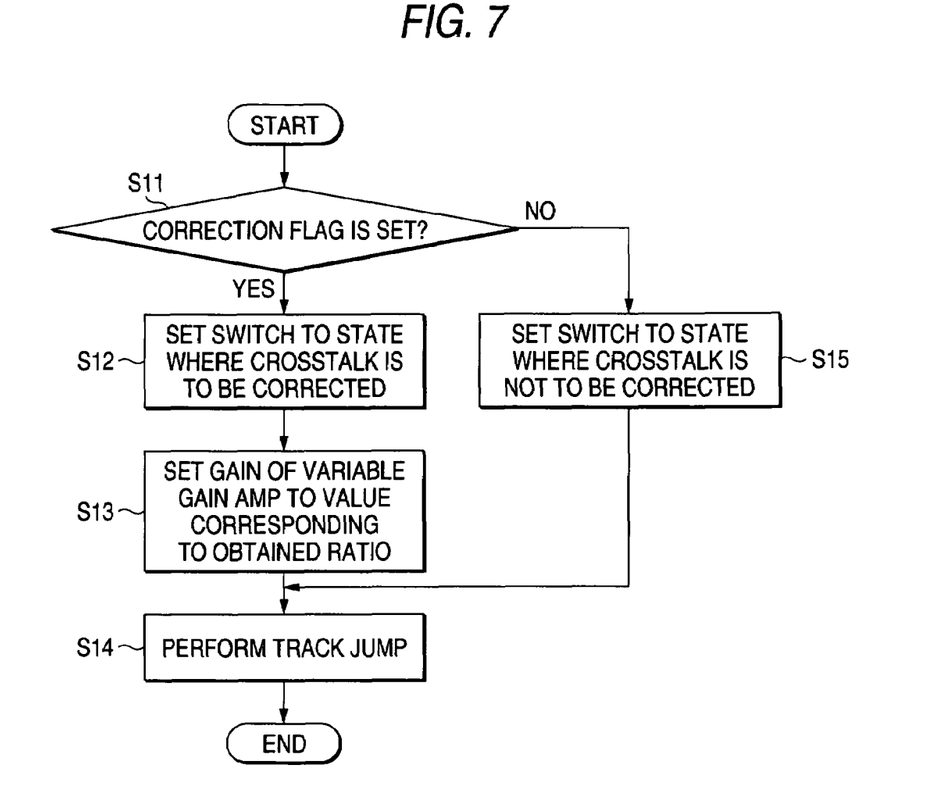
FIG. 7 is a flowchart showing main operations when a track jump for a regular seeking procedure is performed.

FIG. 6 is a flowchart showing main operations of the embodiment when the track jump without applying the tracking servo is performed, and FIG. 7 is a flowchart showing main operations when a track jump for the regular seeking procedure is performed. The operations of the embodiment will be described with reference to the figures as required.

When the power source is turned on under the state where the optical disc 61 is set, or when a tray which is not shown is opened, the optical disc 61 is then set, and the tray is closed, the track jump without applying the tracking servo is implemented together with initial operations for adjusting focusing, the gain of tracking, and the balance. When the track jump without applying the tracking servo is to be performed, the terminal Tc of the switch 53 of the crosstalk correcting section 13 is connected to the terminal Tb. Namely, the track jump without applying the tracking servo is implemented under the state where the crosstalk component of the focus error signal FE is not reduced (steps S1, S2). At this time, the tracking error signal TE has a waveform indicated by TE1 in FIG. 8, and the focus error signal FE has a waveform indicated by FE1.

The change width ratio determining section 15 detects the P-P value L1 of level changes of the tracking error signal TE1, and the P-P value L2 of level changes (the crosstalk component) of the focus error signal FE1. The section obtains the ratio K of the two detected P-P values, and transmits the obtained ratio K to the correction controlling section 54. The correction controlling section 54 internally stores the ratio K (step S3).

On the other hand, in the crosstalk level determining section 14, the focus error signal indicated by FE1 in FIG. 8 is supplied to the comparator 36, and hence the comparator 36 outputs pulses indicated by 361-1 to the counter 35. The comparator 34 outputs pulses indicated by 341 to the counter 37. At the timing when the track jump without applying the tracking servo is ended, therefore, the count values of the counters 35, 37 are equal to each other. Consequently, the count value comparing section 33 determines that the count values of the counters 35, 37 are approximate to each other, or that a crosstalk component exceeding the predetermined level is produced in the focus error signal FE, and transmits information indicative of this to the correction controlling section 54 (step S4). The correction controlling section 54 to which the information is given sets an internal correction flag (steps S5 and S6).

As a result, the operations for initialization are ended. When the track jump for the regular seeking procedure is then to be performed, the correction controlling section 54 checks whether the internal correction flag is set or not (step S11). In this case, the correction flag is set, and it is necessary to reduce a crosstalk component. Therefore, the correction controlling section 54 connects the terminal Tc of the switch 53 to the terminal Ta (step S12), and sets the gain of the gain-variable amplifier 52 to K (step S13).

In the track jump for the regular seeking procedure which is hereinafter performed, therefore, a signal which is obtained by multiplying the tracking error signal TE by K (a signal indicated by 521 in FIG. 8, and its P-P value L3 is equal to L2) is output from the gain-variable amplifier 52 to be subtracted from the focus error signal FE1. The signal which is obtained as a result of the subtraction is transmitted as the corrected focus error signal (the signal indicated by 131 in FIG. 8) to the servo circuit which is not shown. Namely, the focus error signal in which the crosstalk component is reduced is supplied to the servo circuit. Therefore, focus disturbances can be prevented from occurring in the track jump (step S14).

By contrast, when, in the track jump without applying the tracking servo, the level of the focus error signal FE is changed as indicated by FE2 (the width of the level changes is smaller than the predetermined width), no pulse is output from the comparator 36. Therefore, the value of the counter 37 is not updated, and the count value remains to 0. In the detection of step S5, consequently, it is determined that the count value of the counter 35 is not approximate to that of the counter 37, or that a crosstalk component which exceeds the predetermined level is not produced. Information indicative of this is sent to the correction controlling section 54. As a result, the correction controlling section 54 resets the correction flag (steps S5 and S7).

In the track jump for the regular seeking procedure which is hereinafter performed, therefore, the crosstalk component in the focus error signal FE is lower than the predetermined level, and it is not required to reduce the crosstalk component. Consequently, the correction controlling section 54 maintains the state where the contact c of the switch 53 is connected to the contact b, or enables the focus error signal FE which is not corrected, to be output from the differential amplifier 51 (steps S11 and S15). As a result, in the track jump for the regular seeking procedure which is hereinafter performed, the focus error signal FE in which the crosstalk component is not reduced is transmitted to the servo circuit. In this case, the crosstalk component is so small that the track jump is performed without causing focus disturbances.

In the case where, in the track jump without applying the tracking servo, level changes of the focus error signal FE are produced by a cause different from a crosstalk, and the changes indicated by FE3 are therefore produced (the period of the level changes is different from that of the level changes of the tracking error signal TE), the comparator 36 outputs pulses indicated by 361-3. This causes the count value of the counter 37 at the timing when the track jump without applying the tracking servo is ended to be largely different from that of the counter 35. As a result, in the detection of step S5, it is determined that the count value of the counter 35 is not approximate to that of the counter 37, or that a crosstalk component which exceeds the predetermined level is not produced. Information indicative of this is sent to the correction controlling section 54. As a result, the correction controlling section 54 resets the correction flag (steps S5 and S7).

In the track jump in the regular seeking procedure which is hereinafter performed, therefore, the correction controlling section 54 maintains the state where the terminal Tc of the switch 53 is connected to the terminal Tb, or enables the focus error signal FE3 which is not corrected, to be output from the differential amplifier 51 (steps S11 and S15) As a result, a situation where the signal indicated by 521 (the tracking error signal in which level changes are multiplied by K) is subtracted from the focus error signal FE3 is prevented from arising. That is, a situation is prevented from arising where, when the signal indicated by 521 is subtracted from the focus error signal FE3, the level change width in the result of the subtraction is larger than the level change width of the focus error signal FE3, thereby causing focus disturbances. In other words, it is possible to prevent a situation where focus disturbances are more easily caused, from arising in a track jump for the regular seeking procedure.

Incidentally, although it is described in the above not to correct the focus error signal in the track jump in the regular seeking procedure, the optical disk apparatus according to the invention may be configured to continue the correction of the focus error signal in the regular seeking procedure in which a track jump is performed with the tracking servo being applied, to thereby improve a reproducing characteristic of an optical disk having scratches on a reproducing surface. However, considering a decentering of the optical disk, it may be preferable not to correct the focus error signal when in the regular seeking procedure.

The invention is not restricted to the embodiment. In the above, the change width ratio determining section in which the two P-P determining circuits 41, 42 are disposed has been described. In place of the two P-P determining circuits 41, 42, two envelope detection circuits may be disposed (since a result of an envelope detection always has a substantially constant relationship with a P-P value, the ratio detected by the ratio determining section 43 is generally identical with that which is obtained in the case where the P-P determining circuits 41, 42 are used).

As described above, according to the invention, when a crosstalk which may cause focus disturbances such as defocusing is produced, the crosstalk component is reduced by the crosstalk correcting section. In the case where level changes of the focus error signal are produced by a cause different from a crosstalk, the calculation of subtracting the level-corrected tracking error signal from the focus error signal (when this calculation is performed, the level change width of the focus error signal is larger than that before the calculation) is not performed, and hence a situation in which the level change width of the focus error signal is increased is prevented from arising. Moreover, a signal of a level at which a crosstalk component can be most reduced is subtracted from the focus error signal. Furthermore, in the case where level changes of the focus error signal are produced by a cause different from a crosstalk, even when the change width is larger than the predetermined level, it is not determined that the level changes are caused by a crosstalk. Furthermore, the crosstalk level determining section can be easily realized by a relatively simple circuit. Even when a crosstalk component is to be reduced, therefore, a situation where focus disturbances are further increased when level variations of the focus error signal are produced by a cause different from a crosstalk can be prevented from arising, the reduction rate of a crosstalk component can be enhanced, the accuracy of detection on whether a crosstalk component is larger than a predetermined level or not can be improved, and a block for determining whether a crosstalk component is larger than a predetermined level or not can be prevented from being complicated in configuration.

According to the invention, when a crosstalk which may cause focus disturbances such as defocusing is produced, the crosstalk component is reduced by the crosstalk correcting section. In the case where level changes of the focus error signal are produced by a cause different from a crosstalk, the calculation of subtracting the level-corrected tracking error signal from the focus error signal (when this calculation is performed, the level change width of the focus error signal is larger than that before the calculation) is not performed, and hence a situation in which the level change width of the focus error signal is increased is prevented from arising. Even when a crosstalk component is to be reduced, therefore, a situation where focus disturbances are further increased when level variations of the focus error signal are produced by a cause different from a crosstalk can be prevented from arising.

Furthermore, a signal of a level at which a crosstalk component can be most reduced is subtracted from the focus error signal. Therefore, the reduction rate of a crosstalk component can be enhanced.

In the case where level changes of the focus error signal are produced by a cause different from a crosstalk, even when the change width is larger than a predetermined level, it is not determined that the level changes are caused by a crosstalk. Therefore, the accuracy of detection on whether a crosstalk component which is larger than a predetermined level is produced or not can be improved.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk apparatus comprising:
    a photo detector in which a detecting area thereof is divided into four detecting areas by two axes of a track axis arranged in parallel to a track of an optical disk and an axis orthogonal to the track axis, and configured to detect light reflected from the optical disc;
    an error signal generating circuit configured to calculate a first difference between a result of an addition of outputs of one diagonal pair of detecting areas and a result of an addition of outputs of the other diagonal pair of detecting areas, and a second difference between a result of an addition of outputs of a pair of detecting areas positioned on one side with respect to the track axis and a result of an addition of outputs of the other pair of detecting areas positioned on the other side with respect to the track axis, and to output the result of the calculation of the first difference and the second difference as a focus error signal and a tracking error signal, respectively;
    a crosstalk correcting section configured to reduce a crosstalk component in the focus error signal, the crosstalk component produced by the tracking error signal when a track jump is performed;
    a crosstalk level determining section including: a first counting unit configured to count a number of level changes of the tracking error signal; and a second counting unit configured to count a number of level changes of the focus error signal that are larger than a predetermined width, and configured to determine that the crosstalk level is larger than a predetermined value by assuming that the crosstalk component is larger than a width of level changes of the focus error signal is larger than a predetermined value, and a period of level changes of the focus error signal is approximate to a period of level changes of the tracking error signal, in a case where a count result of the first counting unit is approximate to a count result of the second counting unit when the track jump is performed without applying a tracking servo; and
    a change width ratio determining section configured to detect a ratio of a level change width of the tracking error signal and a level change width of the crosstalk component in a case where the track jump is performed without applying the tracking servo,
    wherein the crosstalk correcting section is configured to reduce the crosstalk component by: increasing or decreasing the level change width of the tracking error signal in accordance with the ratio detected by the change width ratio determining section; and subtracting the tracking error signal in which the level change width is increased or decreased, from the focus error signal, in a case where the crosstalk level determining section determines that the crosstalk component is larger than the predetermined level, and is configured not to reduce the crosstalk component in a case where the crosstalk level determining section determines that the crosstalk component is not larger than the predetermined level.

2. An optical disk apparatus comprising:
    a photo detector configured to detect light reflected from an optical disc;
    an error signal generating circuit configured to output a focus error signal and a tracking error signal based on an output of the photo detector;
    a crosstalk correcting section configured to reduce a crosstalk component in the focus error signal, the crosstalk component produced by the tracking error signal when a track jump is performed; and
    a crosstalk level determining section configured to determine whether or not the crosstalk level is larger than a predetermined value in a case where the track jump is performed without applying a tracking servo,
    wherein the crosstalk correcting section is configured to reduce the crosstalk component by use of the tracking error signal in a case where the crosstalk level determining section determines that the crosstalk component is larger than the predetermined level, and is configured not to reduce the crosstalk component in a case where the crosstalk level determining section determines that the crosstalk component is not larger than the predetermined level.

3. The optical disk apparatus as claimed in claim 2, wherein the photo detector comprises a detecting area being divided into the four detecting areas by two axes of a track axis arranged in parallel to a track of the optical disk and an axis orthogonal to the track axis.

4. The optical disk apparatus as claimed in claim 3, wherein the error signal generating circuit is configured to calculate a first difference between a result of an addition of outputs of one diagonal pair of detecting areas and a result of an addition of outputs of the other diagonal pair of detecting areas, and a second difference between a result of an addition of outputs of a pair of detecting areas positioned on one side with respect to the track axis and a result of an addition of outputs of the other pair of detecting areas positioned on the other side with respect to the track axis, and to output the result of the calculation of the first difference and the second difference as a focus error signal and a tracking error signal, respectively.

5. The optical disk apparatus as claimed in claim 2 further comprising a change width ratio determining section configured to detect a ratio of a level change width of the tracking error signal and a level change width of the crosstalk component in a case where the track jump is performed without applying the tracking servo, wherein the crosstalk correcting section is configured to reduce the crosstalk component by: increasing or decreasing the level change width of the tracking error signal in accordance with the ratio detected by the change width ratio determining section; and subtracting the tracking error signal in which the level change width is increased or decreased, from the focus error signal.

6. The optical disk apparatus as claimed in claim 5, wherein the crosstalk correcting section is configured not to reduce the crosstalk component in a case where the crosstalk level determining section determines that the crosstalk component is not larger than the predetermined level.

7. The optical disk apparatus as claimed in claim 2, wherein the crosstalk level determining section determines that the crosstalk level is larger than a predetermined value in a case where the crosstalk component is larger than a width of level changes of the focus error signal is larger than a predetermined value, and a period of level changes of the focus error signal is approximate to a period of level changes of the tracking error signal.

8. The optical disk apparatus as claimed in claim 2, wherein the crosstalk level determining section comprises:

a first counting unit configured to count a number of level changes of the tracking error signal; and a second counting unit configured to count a number of level changes of the focus error signal that are larger than a predetermined width.

9. The optical disk apparatus as claimed in claim 8, wherein the crosstalk level determining section is configured to determine that the crosstalk level is larger than a predetermined value by assuming that the crosstalk component is larger than a width of level changes of the focus error signal is larger than a predetermined value, and a period of level changes of the focus error signal is approximate to a period of level changes of the tracking error signal, in a case where a count result of the first counting unit is approximate to a count result of the second counting unit when the track jump is performed without applying a tracking servo.

* * * * *